United States Patent [19]

Scardilli et al.

[11] Patent Number: 4,559,582
[45] Date of Patent: Dec. 17, 1985

[54] INDICATOR ILLUMINATED WITH ELECTROLUMINESCENT LIGHTING

[75] Inventors: A. Vincent Scardilli, West Orange; Alfred L. Levine, Kinnelon, both of N.J.

[73] Assignee: Allied Corporation, Morris Township, Morris County, N.J.

[21] Appl. No.: 646,407

[22] Filed: Sep. 4, 1984

[51] Int. Cl.⁴ .......................................... G01D 11/28
[52] U.S. Cl. ........................................ 362/23; 362/26; 362/30; 362/84
[58] Field of Search ................... 362/23, 26, 27, 29, 362/30, 84; 116/DIG. 5, DIG. 6, DIG. 26, DIG. 35, DIG. 36

[56] References Cited

U.S. PATENT DOCUMENTS

| | | | |
|---|---|---|---|
| 2,259,910 | 10/1941 | Rylsky | 362/26 |
| 2,287,605 | 6/1942 | Dickson et al. | 362/26 |
| 2,837,052 | 6/1958 | Viret | 362/29 |
| 2,858,632 | 11/1958 | Caserio et al. | 116/DIG. 35 |
| 2,872,567 | 2/1959 | Strange | 362/26 |
| 2,945,145 | 7/1960 | Neugass | 116/DIG. 35 |
| 3,027,668 | 9/1958 | Hardesty | 116/DIG. 35 |
| 4,218,726 | 8/1980 | Fukasawa et al. | 362/23 |
| 4,258,643 | 3/1981 | Ishikawa et al. | 116/DIG. 36 |
| 4,297,681 | 10/1981 | Dircksen | 362/29 |
| 4,380,043 | 4/1983 | Takamatsu et al. | 362/26 |

FOREIGN PATENT DOCUMENTS

| | | | |
|---|---|---|---|
| 594142 | 3/1960 | Canada | 362/26 |
| 1083311 | 9/1967 | United Kingdom | 116/DIG. 35 |
| 2003606 | 3/1979 | United Kingdom | 116/DIG. 36 |

Primary Examiner—Craig R. Feinberg
Assistant Examiner—David A. Okonsky
Attorney, Agent, or Firm—Stanley N. Protigal; Howard G. Massung

[57] ABSTRACT

A moveable pointer (15) on an indicator (11) is illuminated by use of at least one electroluminescent strip (21) which is mounted separately from the pointer (15). The pointer (15) is able to conduct light internally in such a way that light transmitted to one portion (23) of the pointer (15) illuminates another portion of the pointer (25). The electroluminescent strip (21) forms a light source for the pointer (15) so that the strip (21) may be mounted adjacent the pointer's hub (23) in order to provide the necessary illumination. This arrangement permits an indicator (11) to be illuminated with electroluminescent lighting in order that passive vision aids, such as night vision goggles, may be used, while providing sufficient illumination for the indicator's dial pointer (15).

13 Claims, 4 Drawing Figures

INDICATOR ILLUMINATED WITH ELECTROLUMINESCENT LIGHTING

BACKGROUND OF THE INVENTION

This invention is in the field of illumination and more specifically relates to illumination of indicators, such as indicators with dial pointers.

Illumination of display indicators in vehicles is accomplished by either externally directing flood lighting to the indicators or by integral lighting of the indicators. Integral lighting usually involves a source of illumination, such as a light bulb or light directed to the indicator by fiber optics (also using a light bulb source). It is also possible to use back lighting, in which light eminates from behind the surface of the indicator. In that case, separate lighting is required for moveable members, such as dial pointers. The increased popularity of "night vision goggles" and other passive night vision aids, creates unique problems with illumination of cockpit indicators. These passive night vision aids operate by amplifying available light, particularly in the longer wave lengths of visible light. In the upper infrared ranges illumination of cockpit indicators from ordinary incandescent sources overwhelms the sensor elements which are used in such night vision aids, and thereby interrupts the night vision aid for several minutes. It is important that the display indicators remain illuminated, not only for the benefit of the crewmen who are not wearing night vision aids, but also because those using the goggles will typically view the instruments by looking under the goggles. In an attempt to alleviate this problem, attempts have been made to filter the incandescent light. Filtration of the objectionable light must be very efficient because small amounts of light within the active frequency range of the night vision aid will overwhelm the aid, due to the close proximity to the night vision aid of the illuminated indicators.

Conventional passive night vision aids are sensitive to light having wave lengths of 580 nM or longer. This means that illumination of displays at shorter wave lengths (frequencies above the frequency range of the passive night vision aids) will not substantially interfere with the night vision aids and will facilitate the use of such night vision aids.

As previously indicated, filtration of incandescent light is often inadequate. Where each indicator has its own individual light sources, such filtration can become very cumbersome. Electroluminescent lighting is therefore a preferred method of illuminating such displays. Efficient electroluminescent displays are available which transmit most of the optical energy at shorter wave lengths than the 580 nM frequency. A reasonable amount of filtration can be used to filter any light transmitted at wave lengths above the 580 nM cut-off point.

One problem with electroluminescent lighting of displays is that the background of the display can be easily illuminated, but illumination of moveable elements, such as pointers, is often difficult. Thus, electroluminescent lighting is ideal for back lighting of liquid crystal displays and for controls, where the back-lit area is not moved and is not sensitive to frictional forces. In the case of controls, the indicator, being manually operated, can carry an electroluminescent light source, connected by wires or slip rings. On the other hand, dial pointers are often connected to sensitive movements. The use of slip rings and connecting wires can have a detrimental effect on the performance and reliability of such indicators. One method of illuminating such a display is to illuminate the display from the perimeter of the display, with the dial pointer being configured to reflect the light from the side of the display. The effect of such an illumination technique is to provide a substantial amount of lighting for the background of the display (the numerals and graduations) while providing very little illumination for the pointer.

For these reasons, it is desired to provide a more convenient and efficient technique for illuminating moveable pointer indicators at light frequencies which do not extend past (below) a predetermined limit. It is a further object of the invention to provide a method for directly illuminating the moveable pointer to a display with illumination that fits within the above frequency criteria. It is a further object of the invention to provide a method for using electroluminescent light sources for illuminating a moveable pointer on a display, without interfering with the movement of the moveable pointer.

SUMMARY OF THE INVENTION

In accordance with the present invention, electroluminescent lighting is used to illuminate an indicator having a moveable pointer element by illuminating the inside of the pointer element. The pointer element is made of a light-refracting material which conducts light to an indicating portion of the pointer. A shaft portion of the pointer element is mounted to an output shaft which is part of the indicator's movement. The shaft portion of the pointer element is surrounded by an electroluminescent light source so that the light from the source is transmitted through the pointer element to the indicator portion of the pointer element. The electroluminescent light source does not interfere with the pointer element or the remaining indicator movement. The light source may be used to illuminate a face-plate associated with the display or a second light source may be used for such illumination. The present invention allows the use of electroluminescent light sources with pointer type indicators so as to eliminate saturation problems associated with other types of lighting when used in conjunction with night vision aids.

DETAILED DESCRIPTION OF THE PREFERRED EMBODIMENT

Figure 1:
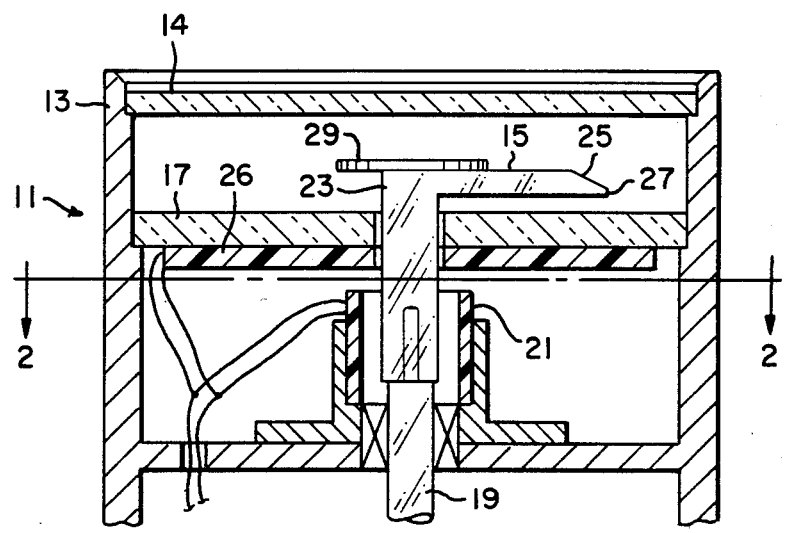
FIG. 1 shows a side cross-sectional view of one embodiment of the invention.

FIG. 1 shows a side view of a front portion of a dial indicator 11. As usual, the indicator 11 includes a housing 13, a dial pointer 15 and a faceplate 17. The faceplate 17 has appropriate indicia (not shown) on it in order that the dial pointer 15 can indicate a measured condition in the known manner.

The dial pointer 15 is attached to a shaft 19, which extends from a movement (not shown) in order that the dial pointer 15 can be moved to reflect the appropriate condition to be indicated. In the present invention, the dial pointer 15 is illuminated by light passing through the pointer 15 itself. For this reason, the dial pointer 15 is made of light-conducting material. In the embodiment of FIG. 1, the dial pointer 15 is illuminated from a source of light 21 located below the faceplate 17. Therefore, the dial pointer 15 is fixed to an extended shaft-engaging hub 23, which extends from the pointer 15 to below the faceplate 17. The hub 23 is also made of a light conducting material and is compatible with the material from which the dial pointer 15 is made. Preferably the hub 23 is formed with the dial pointer 15.

According to the invention, the light source 21 is an electroluminescent light source which surrounds the light-conducting material located, in this case, at the hub 23. As can be seen more clearly in FIG. 2, the electroluminescent light source 21 surrounds the extended hub 23 in the form of a broken cylinder and is located below the faceplate 17. Light is emitted from the inside surface of the electroluminescent light source 21 and is thereby transmitted to the hub 23, which transmits the light to the dial pointer 15. The dial pointer 15 may be allowed to glow along its length, although a tapered end 25 is cut so that the end 25 exhibits a particularly brilliant display of light emanating from the light source 21.

Figure 3:
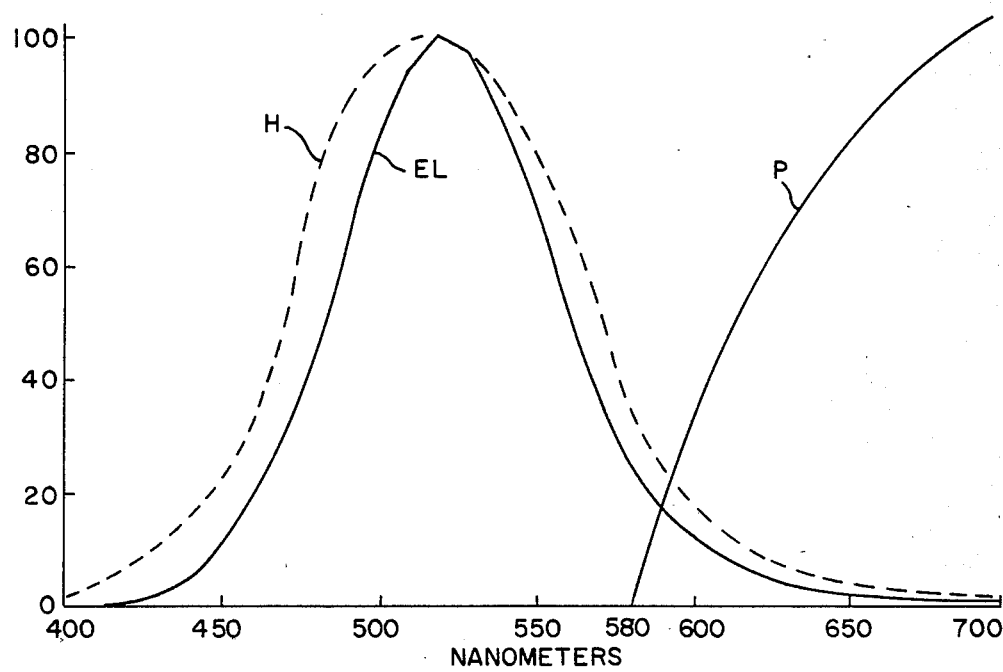
FIG. 3 is a graphic representation of optical frequency characteristics used in designing the present invention.

Referring to FIG. 3, light generated by electroluminescent light source such as light source 21 normally exhibits a sharp peak in light generated at a particular frequency. The characteristics of a selected electroluminescent light source are indicated by curve EL. In the example given, a blue-green electroluminescent source has a light peak at 510 nM. The generated light tends to be greatly diminished at approximately 600 nM and is virtually nil at approximately 650 nM. Curve P indicates the response of a passive vision device such as night goggles. The passive vision device starts to become sensitive at approximately 580 nM and increases its sensitivity at lower frequencies. The 580 nM frequency is within the range of human vision, indicated by Curve H, with human vision extending to higher frequencies, or shorter wavelengths, of light. The frequency response of human vision, indicated by curve H, is merely an approximation because of differences occurring between individuals.

Significantly, if we accept curve H as a minimum vision range, any illumination of instrumentation must occur within that range in order to be considered to be effective. As can be seen, the illumination from the electroluminescent light source, indicated by curve EL, partly fits within this range. Illumination also partly overlaps the sensitivity range of most passive vision aids, indicated by curve P.

As can be seen, this overlapping range of illumination EL and sensitivity P is fairly limited and occurs at low levels of illumination as indicated on curve EL and at low levels of sensitivity, as indicated on curve P. In order to eliminate this small amount of illumination at wave lengths above 580 nM, a filter is used to filter out light having wavelengths above 580 nM. The light absorbed by such a filter would be normally of low intensity. This has two advantages. Firstly, filtration, in order to be effective, need only be accomplished with a limited amount of efficiency. Secondly, filtration of light produces heat from the absorbed light energy. Since only a small amount of light generated by the electroluminescent light source would be filtered, only a small amount of heat would be generated by the filter.

Figure 2:
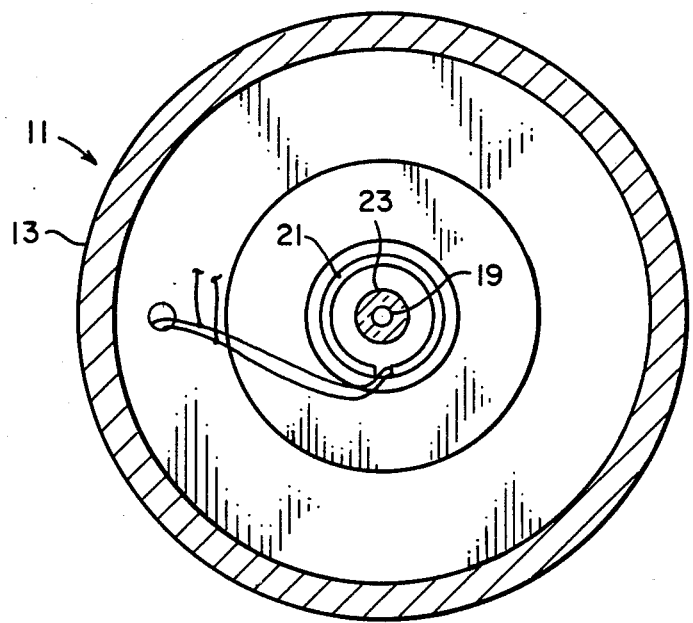
FIG. 2 shows a top view of the embodiment of FIG. 1, taken along lines 2—2 of FIG. 1.

Referring to FIGS. 1–2, such filtration would preferably occur at the light source 21, and could be included integrally with the light source 21. Alternatively, separate filters (not shown) or a filtering characteristic of the dial pointer 15 and hub 23 could be utilized. It is preferable to incorporate filtration into electroluminescent source 21 itself because any light which may leak from the dial indicator 11 would thereby automatically be filtered.

While the illumination of the dial pointer 15 is the primary object of the present invention, it is also important to illuminate appropriate portions of the faceplate 17. In order to accomplish this, an additional electroluminescent light source 26 may be placed behind the faceplate 17 in order to back light the faceplate 17.

In order to prevent light from the electroluminescent source 21 from leaking past the faceplate 17, the hub 23 has an opaque flange 29 mounted to it above the dial pointer 15. This flange 29 is at the center of the dial pointer 15 and thereby does not obstruct any important part of the dial pointer 15 or the faceplate 17.

While an ideal shape of the electroluminescent light source 21 is the cylindrical shape shown in FIGS. 1 and 2, it may be difficult to obtain electroluminescent light sources which can be produced with a sufficiently small diameter to use that configuration without being subject to cracking of one of the layers of the electroluminescent light source 21. An alternative embodiment, shown in FIG. 4 may be used. In this case, the electroluminescent light source is in the form of a pair of flexible sheets 41, 42. The flexible sheets 41, 42 are caused to bend around an extended hub 23' which is attached to a dial pointer 15'. A series of pins 46 guide the sheets 41, 42 in a gentle radius so as to clear the hub 23'.

Figure 4:
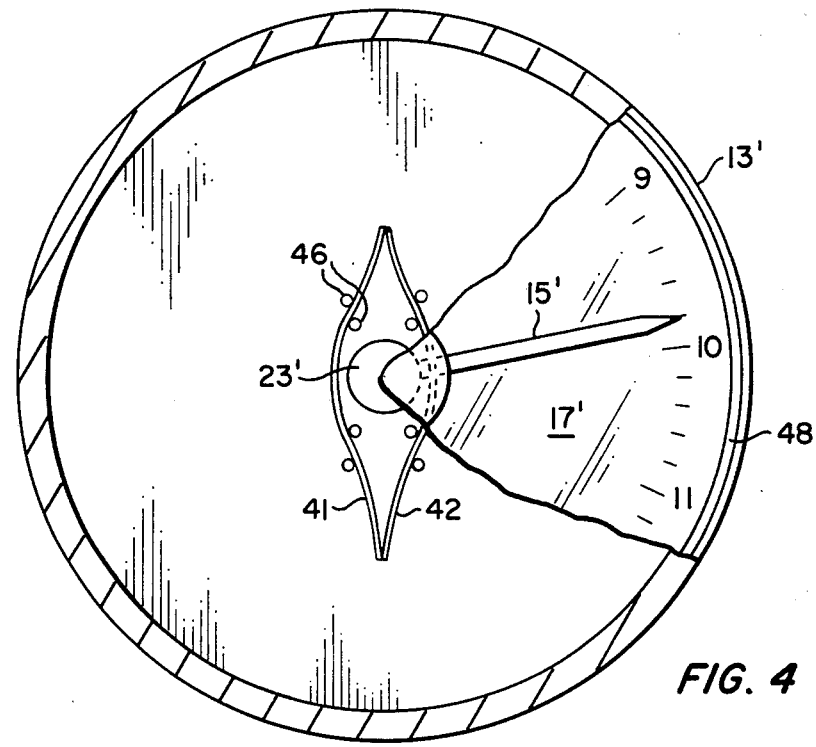
FIG. 4 shows a top, partially sectioned view of a second embodiment of the invention in which a pair of electroluminescent strips are used to illuminate the pointer element.

Referring to FIG. 4, it is possible to illuminate the dial pointer 15 by means of a strip 48 on the inside perimeter of the indicators housing 13'. The light from the strip 48 would be transmitted to the hub 23' behind a faceplate 17'. The light transmitted to the hub 23' from behind the faceplate 17', and the configuration would be very similar to that shown in FIGS. 1 and 2, except that the light source includes strip 48, adjacent the housing 13'.

In each of the above arrangements, a dial pointer, such as dial pointer 15, is illuminated by using an electroluminescent light source which is mounted externally of the dial pointer. It is, therefore, not necessary to provide a means to conduct electricity to the dial pointer. It is anticipated that various modifications may be made to the design as specified in the preferred embodiment without departing from the inventive concepts. For example, various expedients can be provided for illuminating indicators with a plurality of coaxial dial pointers. It is also possible to use the principles of the present invention with indicators having other types of pointers, in which the pointer is allowed to move with respect to a stationary lighting source that transfers light to the pointer so that the pointer may be internally illuminated. Accordingly, the invention should be read only as limited by the claims.

What is claimed is:

1. Electroluminescent lighting means for illuminating an indicator which moves relatively to a graduated scale, characterized by:
  an electroluminescent light source;
  a shaft which includes an optical receiving element;
  an optical transmitting media optically connected to the optical receiving element and to the indicator, the shaft being fixed to the optical receiving element and to the indicator;

the electroluminescent light source substantially surrounding the optical receiving element in at least one plane; and the indicator having a capability of receiving light from the light transmitting media and transmitting said light for viewing.

2. Apparatus as described in claim 1, further characterized in that:

the electroluminescent light source is further provided with a filter which selectively blocks light within a predetermined part of the optical spectrum.

3. Dial indicator having a graduated scale and a pointer which rotates substantially about an axis to move relative to the graduated scale, in which the dial indicator is illuminated so as to indicate a position of the dial indicator with respect to the scale, characterized in that:

the pointer has a light receiving part which is remote from an indicating end of the pointer, said light receiving part extending along said axis;

the pointer has a property of transmitting light from the light receiving part to the indicating end;

an electroluminescent light source is located adjacent to said light receiving part and arranged so that said light receiving part is substantially surrounded by the electroluminescent light source in at least one plane about the light receiving part.

4. Apparatus as described in claim 3, further characterized in that:

the pointer includes a light refracting material which provides said property of transmitting light.

5. Apparatus as described in claim 3, further characterized in that:

the electroluminescent light source is further provided with a filter which selectively blocks light within a predetermined part of the optical spectrum.

6. Apparatus as described in claim 3, further characterized in that:

the light receiving part is substantially surrounded by the electroluminescent light source.

7. Apparatus as described in claim 3, further characterized by:

the electroluminescent light source further providing back lighting for the graduated scale.

8. Apparatus as described in claim 3, further characterized in that:

the pointer includes a shaft engaging portion, which extends parallel to said axis and rotates about said axis; and the pointer includes a member which extends from the shaft engaging portion to the indicating end in a direction approximately normal to said axis.

9. Apparatus as described in claim 8, further characterized in that:

said axis extends through the shaft engaging portion.

10. Apparatus as described in claim 9, further characterized in that:

said member is located axially in front of the shaft engaging portion when viewed externally.

11. Apparatus as described in claim 3, further characterized by:

the electroluminescent light source being located beyond the outer dimension of the graduated scale and providing illumination for the graduated scale.

12. Apparatus as described in claim 11, further characterized by:

the electroluminescent light source being located at least partially about the graduated scale.

13. Apparatus as described in claim 11, further characterized by:

the electroluminescent light source further providing back lighting for the graduated scale.

* * * * *